United States Patent
Archibald et al.

(10) Patent No.: US 9,646,200 B2
(45) Date of Patent: May 9, 2017

(54) FAST POSE DETECTOR

(71) Applicant: QUALCOMM Incorporated, San Diego, CA (US)

(72) Inventors: Fitzgerald John Archibald, North York (CA); Francis B. MacDougall, Toronto (CA)

(73) Assignee: QUALCOMM INCORPORATED, San Diego, CA (US)

( * ) Notice: Subject to any disclaimer, the term of this patent is extended or adjusted under 35 U.S.C. 154(b) by 521 days.

(21) Appl. No.: 13/843,907

(22) Filed: Mar. 15, 2013

(65) Prior Publication Data

US 2013/0329946 A1    Dec. 12, 2013

Related U.S. Application Data

(60) Provisional application No. 61/657,565, filed on Jun. 8, 2012.

(51) Int. Cl.
*G06K 9/00*       (2006.01)
(52) U.S. Cl.
CPC ..... *G06K 9/00355* (2013.01); *G06K 9/00335* (2013.01); *G06K 9/00375* (2013.01)
(58) Field of Classification Search
None
See application file for complete search history.

(56) References Cited

U.S. PATENT DOCUMENTS 6,009,210 A    12/1999  Kang
6,639,998 B1 *  10/2003  Lee et al. ............... 382/103

(Continued)

FOREIGN PATENT DOCUMENTS

JP    2005062910 A    3/2005
JP    2005184722 A    7/2005

(Continued)

OTHER PUBLICATIONS

Chen, Yen-Ting, and Kuo-Tsung Tseng. "Developing a multiple-angle hand gesture recognition system for human machine interactions." Industrial Electronics Society, 2007. IECON 2007. 33rd Annual Conference of the IEEE. IEEE, 2007.*

(Continued)

*Primary Examiner* — Chan Park
*Assistant Examiner* — Geoffrey E Summers
(74) *Attorney, Agent, or Firm* — Kilpatrick Townsend & Stockton LLP

(57) ABSTRACT

Methods and apparatuses are presented for determining whether a gesture is being performed in a sequence of source images. In some embodiments, a method includes detecting a gesture in each of one or more reference images using one or more gesture models of a plurality of gesture models. The method may also include selecting a first gesture model from the one or more gesture models that most closely matches the detected gesture, prioritizing the first gesture model over other gesture models in the plurality of gesture models for searching for the gesture in the sequence of source images, and scanning the sequence of source images to determine whether the gesture is being performed, using the prioritized first gesture model. If the gesture is being performed, the method may end scanning prior to using another gesture model of the plurality of gesture models to determine whether the gesture is being performed.

21 Claims, 11 Drawing Sheets

(56) References Cited

U.S. PATENT DOCUMENTS

| | | | |
|---|---|---|---|
| 2005/0190972 A1 | 9/2005 | Thomas et al. | |
| 2005/0265583 A1 | 12/2005 | Covell et al. | |
| 2008/0244465 A1 | 10/2008 | Kongqiao et al. | |
| 2009/0327977 A1 | 12/2009 | Bachfischer et al. | |
| 2010/0194762 A1 | 8/2010 | Latta et al. | |
| 2010/0266210 A1* | 10/2010 | Markovic et al. | 382/195 |
| 2010/0295783 A1* | 11/2010 | El Dokor et al. | 345/158 |
| 2010/0306710 A1 | 12/2010 | Poot | |
| 2011/0007079 A1 | 1/2011 | Perez et al. | |
| 2011/0119640 A1* | 5/2011 | Berkes | G06F 3/011 715/863 |
| 2011/0156999 A1 | 6/2011 | Wu et al. | |
| 2011/0222726 A1 | 9/2011 | Ruan | |
| 2011/0301934 A1* | 12/2011 | Tardif | 704/1 |
| 2012/0027252 A1 | 2/2012 | Liu et al. | |
| 2012/0070035 A1* | 3/2012 | Koo et al. | 382/103 |
| 2012/0114255 A1 | 5/2012 | Kimura | |
| 2012/0281129 A1* | 11/2012 | Wang | H04N 5/23219 348/333.01 |

FOREIGN PATENT DOCUMENTS

| | | | |
|---|---|---|---|
| JP | 2006172439 A | 6/2006 | |
| JP | 2009530726 A | 8/2009 | |
| JP | 2011192090 A | 9/2011 | |
| JP | 2011221699 A | 11/2011 | |
| JP | 2012048602 A | 3/2012 | |
| JP | 2012098988 A | 5/2012 | |
| JP | 2012516507 A | 7/2012 | |
| JP | 2012526328 A | 10/2012 | |
| JP | 2012533134 A | 12/2012 | |
| WO | 2006086508 A2 | 8/2006 | |
| WO | 2009156565 A1 | 12/2009 | |

OTHER PUBLICATIONS

Li, Yongmin, et al. "Support vector machine based multi-view face detection and recognition." Image and Vision Computing 22.5 (2004): 413-427.*

Sherrah, Jamie, and Shaogang Gong. "Exploiting context in gesture recognition." Modeling and Using Context. Springer Berlin Heidelberg, 1999. 515-518.*

"Shooting Group Photos Easily Using the Face Self-Timer." Canon. Canon, Mar. 31, 2009. Web. Jul. 21, 2015.*

Szeliski, Richard. Computer Vision: Algorithms and Applications. London: Springer, 2011. 127-36. Print.*

International Search Report and Written Opinion—PCT/US2013/041766—ISA/EPO—Aug. 23, 2013.

Hamada Y., et al., "Hand Gesture Recognition Under Complex Backgrounds Based on Transition Network", JPSJ SIC Technical Report, vol. 2005, No. 88, Japan, Information Processing Society of Japan, Sep. 6, 2005, 2005-CVIM-150, pp. 9-16, ISSN 0919-6072.

* cited by examiner

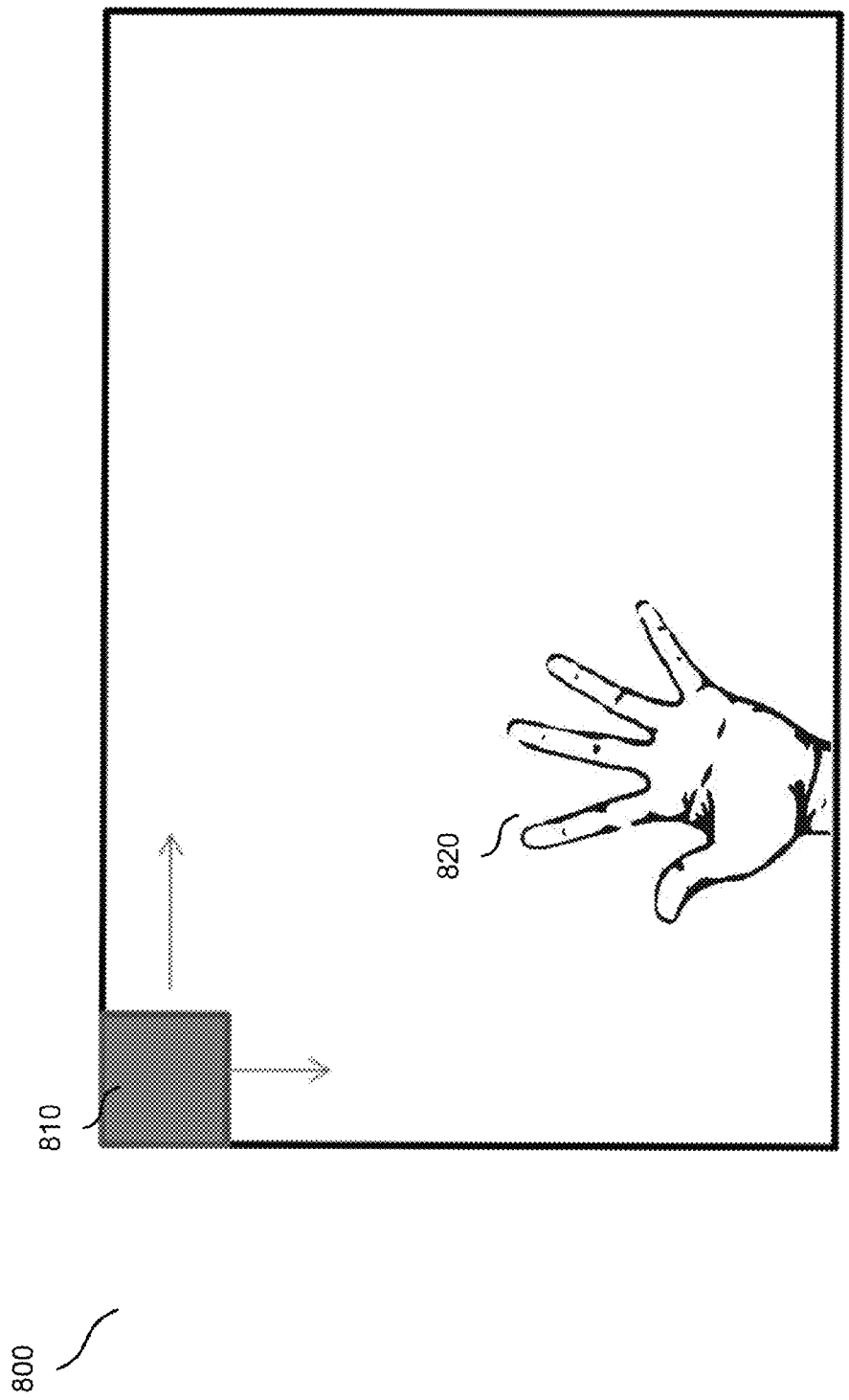

FAST POSE DETECTOR

CROSS REFERENCE TO RELATED APPLICATIONS

This application claims the benefit of U.S. Provisional Patent Application No. 61/657,565, filed Jun. 8, 2012, and titled "FAST POSE DETECTOR," the disclosure of which is hereby incorporated herein by reference in its entirety and for all purposes.

BACKGROUND

The present disclosures relate to gesture detection in recorded images. More specifically, the present disclosures discuss efficient methods and apparatuses for improving the speed, accuracy, and resources consumed when detecting gestures in a first image and a sequence of images. A number of techniques are known in the art for detecting gestures, such as hand poses, arm motions, and the like. However, many may rely on high performance processors that may be found only in large, power consuming machines. Gesture detection methods may not be very efficient, making such methods difficult for use in smaller mobile devices, and/or for use in constant, real-time image recording. It is desirable then to implement gesture detection methods that are less time-consuming and more power efficient.

SUMMARY

These problems and others may be solved according to various embodiments, described herein.

In some embodiments, a method is presented for determining whether a gesture is being performed in a sequence of source images. The method may include detecting a gesture in each of one or more reference images using one or more gesture models of a plurality of gesture models. The method may further include selecting a first gesture model from the one or more gesture models that most closely matches the detected gesture, prioritizing the first gesture model over other gesture models in the plurality of gesture models for searching for the gesture in the sequence of source images, and scanning the sequence of source images to determine whether the gesture is being performed, using the prioritized first gesture model. If the gesture is being performed, the method may also include ending scanning prior to using another gesture model of the plurality of gesture models to determine whether the gesture is being performed.

In some embodiments, the reference images include previous images in the sequence of source images. In some embodiments, the plurality of gesture models includes hand poses. In some embodiments, the plurality of gesture models includes facial expressions. In some embodiments, the plurality of gesture models includes a left open hand model, a right open hand model, or a fist model.

In some embodiments, the method further includes prioritizing a position of the detected gesture in the one or more reference images over other positions for searching for the gesture in the sequence of source images, and scanning the sequence of source images to determine whether the gesture is being performed, using the prioritized position of the detected gesture.

In some embodiments, the method further includes prioritizing a scale of the detected gesture in the one or more reference images over other scales for searching for the gesture in the sequence of source images, and scanning the sequence of source images to determine whether the gesture is being performed, using the prioritized scale of the detected gesture.

In some embodiments, the method further includes prioritizing a position of the detected gesture in the one or more reference images over other positions for searching for the gesture in the sequence of source images, prioritizing a scale of the detected gesture in the one or more reference images over other scales for searching for the gesture in the sequence of source images, and scanning the sequence of source images to determine whether the gesture is being performed, using a combination of the prioritized position of the detected gesture, the prioritized scale of the detected gesture, and the prioritized first gesture model.

In some embodiments, the method further includes ending scanning for the gesture in the sequence of source images before completing a full scan of the sequence of source images if a predetermined number of gestures is detected in the sequence of source images.

In some embodiments, the method further includes determining that a second gesture is less likely to be detected in the one or more reference images than the gesture. The method may also include detecting the one or more reference images for the second gesture after detecting the gesture based on determining that the second gesture is less likely to be detected.

In some embodiments, the method further includes scanning the one or more reference images for the gesture and refining the scan of the one or more reference images for the gesture in a plurality of cascaded stages ordered in a successive number of stages. Each stage of the cascaded stages may include scanning a periodic number of pixels in the image to detect the gesture. The periodic number of pixels may have a constant vertical and horizontal distance away from each other pixel in the periodic number of pixels, and the periodic number of pixels in any stage may be less than or equal to the periodic number of pixels in a previous stage. The method may also include identifying the gesture by determining if a last stage of the successive number of stages detects at least a portion of the gesture.

In some embodiments, an apparatus for determining whether a gesture is being performed in a sequence of source images is presented. The apparatus may include a memory configured to store one or more reference images and the sequence of images. The apparatus may also include a processor communicatively coupled to the memory. The processor may be configured to: detect a gesture in each of one or more reference images using one or more gesture models of a plurality of gesture models; select a first gesture model from the one or more gesture models that most closely matches the detected gesture; prioritize the first gesture model over other gesture models in the plurality of gesture models for searching for the gesture in the sequence of source images; scan the sequence of source images to determine whether the gesture is being performed, using the prioritized first gesture model; and if the gesture is being performed, end scanning prior to using another gesture mode.

In some embodiments, an apparatus is presented. The apparatus may include: means for detecting a gesture in each of one or more reference images using one or more gesture models of a plurality of gesture models; means for selecting a first gesture model from the one or more gesture models that most closely matches the detected gesture; means for prioritizing the first gesture model over other gesture models in the plurality of gesture models for searching for the gesture in the sequence of source images; means for scanning the sequence of source images to determine whether the gesture is being performed, using the prioritized first gesture model; and if the gesture is being performed, means for ending scanning prior to using another gesture model of the plurality of gesture models to determine whether the gesture is being performed.

In some embodiments, a non-transitory processor-readable medium is presented. The non-transitory processor-readable medium may include processor-readable instructions configured to cause a processor to: detect a gesture in each of one or more reference images using one or more gesture models of a plurality of gesture models; select a first gesture model from the one or more gesture models that most closely matches the detected gesture; prioritize the first gesture model over other gesture models in the plurality of gesture models for searching for the gesture in a sequence of source images; scan the sequence of source images to determine whether the gesture is being performed, using the prioritized first gesture model; and if the gesture is being performed, end scanning prior to using another gesture model of the plurality of gesture models to determine whether the gesture is being performed.

In some embodiments, methods and apparatuses are presented to detect one or more gestures, for example a hand pose. In some embodiments, methods include detecting an open palm, for example an open palm(s) extended in front of a camera or visual device. These embodiments are not limiting, however, and those of skill in the art will recognize that embodiments described below may be used to detect other poses and/or gestures or motions. In some embodiments, cascaded weak classifiers are employed for detecting the poses or gestures. In some embodiments, the detection methods may be cycle intensive, for example, detections may focus on multi-scale video frames and on each pixel of each frame.

In some embodiments, the method presented may be a first step in a hand-tracker algorithms. In some embodiments, initial engagement position or re-engagement position and/or tracking of a current position relative to the initial engagement position may be provided, for example. In some embodiments, engagement is recognized if a pose is stationary for a period of time, for example 500 ms. In some embodiments the methods may be running even when a device for viewing is in standby mode so that gestures can be recognized for powering on the device. In addition, some methods may run at low periodicity to recover (re-engagement) from false and/or lost tracking.

In some embodiments, methods may include at least four parts: scaling, pre-processing, response calculation, and rectangle result processing.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 8 illustrates an example model sliding on a video frame according to some embodiments.

DETAILED DESCRIPTION

Figure 1:
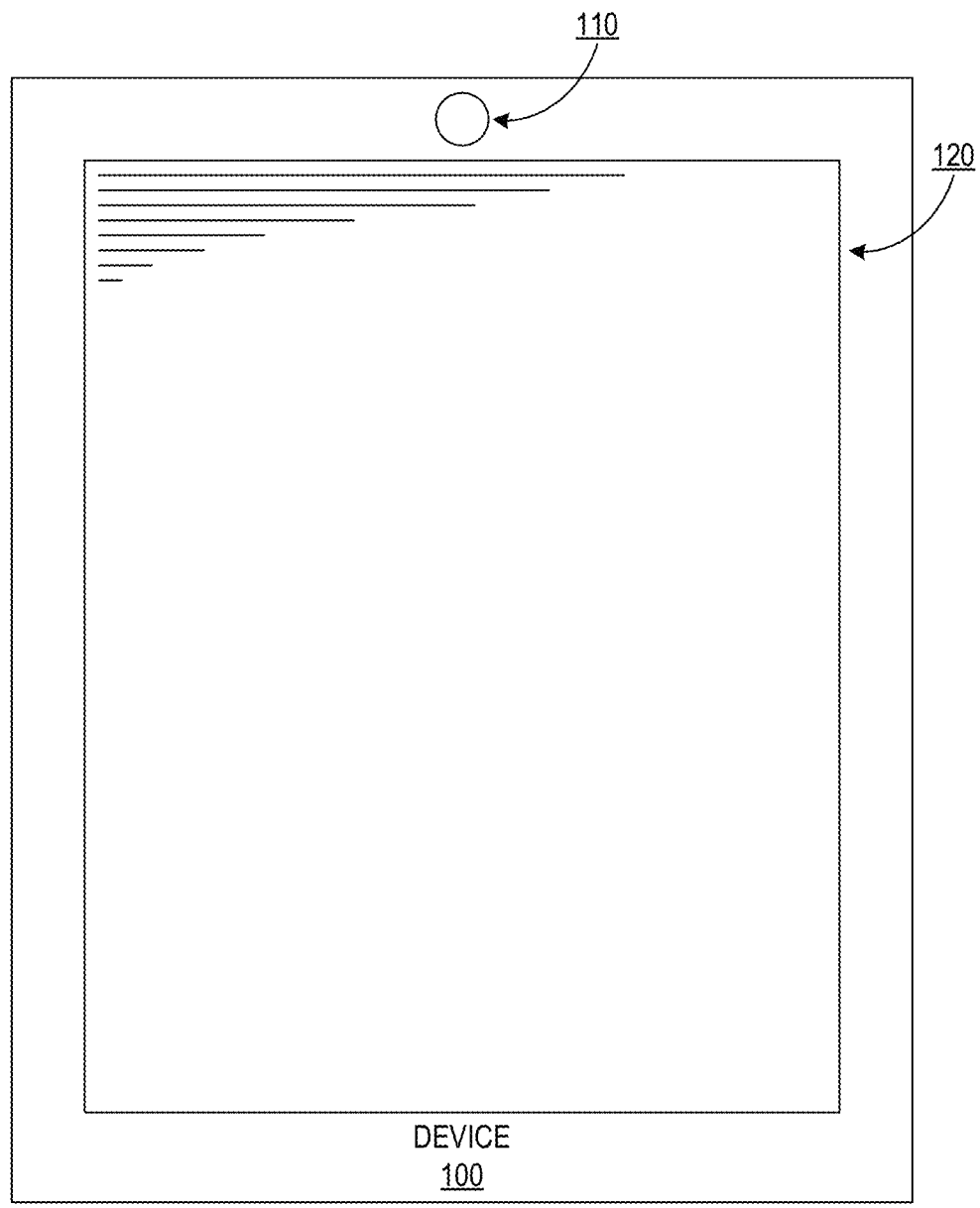
FIG. 1 is an illustration of an example device according to some embodiments.

The word "exemplary" is used herein to mean "serving as an example, instance, or illustration." Any embodiment or design described herein as "exemplary" is not necessarily to be construed as preferred or advantageous over other embodiments or designs.

As used herein, a "gesture" may refer to a form of non-verbal communication made with part of a human body, and is contrasted with verbal communication such as speech. For instance, a gesture may be defined by a movement, change or transformation between a first position, pose, or expression and a second pose, position, or expression. As used herein, a "gesture" may also include a static pose made with part of the human body. For example, a "gesture" may include a still pose showing only part of a motion made. Common gestures used in everyday discourse may include for instance, an "air quote" gesture, a bowing gesture, a curtsey, a cheek-kiss, a finger or hand motion, a genuflection, a head bobble or movement, a high-five, a nod, a sad face, a raised fist, a salute, a thumbs-up motion, a pinching gesture, an open palm, a closed fist, a shaking fist, a pointing finger, a "peace" sign, or any hand or body twisting motion. A gesture may be detected using a camera, such as by analyzing an image of a user, using a tilt sensor, such as by detecting an angle that a user is holding or tilting a device, or by any other approach. As those of skill in the art will appreciate from the description above and the further descriptions below, a gesture may comprise a non-touch, touchless, or touch-free gesture such as a hand movement performed in mid-air, for example. Such non-touch, touchless, or touch-free gestures may be distinguished from various "gestures" that might be performed by drawing a pattern on a touchscreen, for example, in some embodiments. In some embodiments, a gesture may be performed in mid-air while holding a device, and one or more sensors in the device such as an accelerometer may be used to detect the gesture.

A user may make a gesture (or "gesticulate") by changing the position (i.e. a waving motion) of a body part, or may gesticulate while holding a body part in a constant position (i.e. by making a clenched fist gesture). In some arrangements, hand and arm gestures may be used to control functionality via camera input, while in other arrangements, other types of gestures may additionally or alternatively be used. Additionally or alternatively, hands and/or other body parts (e.g., arms, head, face, torso, legs, feet, etc.) may be moved in making one or more gestures. For example, some gestures may be performed by moving one or more hands, while other gestures may be performed by moving one or more hands in combination with one or more arms, one or more legs, and so on. In some embodiments, a gesture may comprise a certain pose, for example a hand or body pose, being maintained for a threshold amount of time.

Methods and apparatuses are presented for efficiently detecting gestures or poses of objects in view of an imaging device. The step of detecting a gesture or pose of the object can be processor- and memory-intensive using traditional methods. Some available gesture devices employing gesture algorithms and methods are very CPU intensive when trying to track a single hand, for example. Due to high CPU usage, mobile devices trying to employ gesture detection methods may provide a user with a bad experience. High CPU usage rates may result in lower frame rates of gesture detection, possibly resulting in slow, unusable and even unreliable tracking results, high battery consumption and overheating devices. However, according to various embodiments, detecting the gesture or pose may consume less power and successfully detect the gesture or pose in less time. For example, embodiments may be able to detect an open-palm motion of a user's right hand in a 176×144 pixel frame using 30% less time without a decrease in accuracy compared to traditional methods.

In some embodiments, a model of the pose or gesture may be used to more efficiently detect the pose or gesture. For example, in a prior reference image related to the current image in question (called source image), the pose or gesture may be identified using slower or more processor intensive image recognition techniques. A model of the pose or gesture detected in the reference image may then be identified. The disclosures herein may refer to this model as a gesture model. The gesture model may be a composite of hundreds or thousands of images of that same pose or gesture. In some embodiments, the gesture model is an ideal pose or gesture based on the hundreds or thousands of images of that same pose or gesture. The identified gesture model may then be used to detect that same type of gesture or pose in the source image. In some embodiments, this technique may save 50% resources because in many cases the gesture or pose detected in the reference image is likely to be the same as the one detected in the source image. In some embodiments, detection using the gesture model and the described techniques may occur for a sequence of source images. For example, in some embodiments, once the gesture model is selected, the source images may be scanned by comparing portions of the image with the entire gesture model or features of the gesture model, before comparing those portions of the image with other models. These comparisons may determine that the gesture is being performed in the image if the similarities in the comparisons rise above some threshold, or the comparisons fall within predefined constraints, for example. The comparisons may be the same type of techniques used to detect the gesture in the reference images using the gesture models. However, one advantage when scanning the source images with the prioritized gesture model is that the prioritized gesture model is more likely to match the gesture in the source images, and thus resources are saved by not having to scan the images starting with other models.

Referring to FIG. 1, an example device is illustrated that may implement one or more aspects of the disclosure. For example, computing device 100 may be a personal computer, set-top box, camera, electronic gaming console device, laptop computer, smart phone, tablet computer, personal digital assistant, or other mobile device that is equipped with one or more sensors that allow computing device 100 to capture motion and/or other sensed conditions as a form of user input. For instance, computing device 100 may be equipped with, communicatively coupled to, and/or otherwise include one or more cameras, microphones, proximity sensors, gyroscopes, accelerometers, pressure sensors, grip sensors, touch screens, and/or other sensors. In addition to including one or more sensors, computing device 100 also may include one or more processors, memory units, and/or other hardware components, as described in greater detail below. In some embodiments, the device 100 is incorporated into an automobile, for example in a central console of the automobile.

In one or more arrangements, computing device 100 may use any and/or all of these sensors alone or in combination to recognize gestures, for example gestures that may not include a user touching the device 100, performed by one or more users of the device. For example, computing device 100 may use one or more cameras, such as camera 110, to capture hand and/or arm movements performed by a user, such as a hand wave or swipe motion, among other possible movements. In addition, more complex and/or large-scale movements, such as whole body movements performed by a user (e.g., walking, dancing, etc.), may likewise be captured by the one or more cameras (and/or other sensors) and subsequently be recognized as gestures by computing device 100, for instance. In yet another example, computing device 100 may use one or more touch screens, such as touch screen 120, to capture touch-based user input provided by a user, such as pinches, swipes, and twirls, among other possible movements. While these sample movements, which may alone be considered gestures and/or may be combined with other movements or actions to form more complex gestures, are described here as examples, any other sort of motion, movement, action, or other sensor-captured user input may likewise be received as gesture input and/or be recognized as a gesture by a computing device implementing one or more aspects of the disclosure, such as computing device 100.

In some embodiments, for instance, a camera such as a depth camera may be used to control a computer or media hub based on the recognition of gestures or changes in gestures of a user. Unlike some touch-screen systems that might suffer from the deleterious, obscuring effect of fingerprints, camera-based gesture inputs may allow photos, videos, or other images to be clearly displayed or otherwise output based on the user's natural body movements or poses. With this advantage in mind, gestures may be recognized that allow a user to view, pan (i.e., move), size, rotate, and perform other manipulations on image objects.

A depth camera, such as a structured light camera or a time-of-flight camera, may include infrared emitters and a sensor. The depth camera may produce a pulse of infrared light and subsequently measure the time it takes for the light to travel to an object and back to the sensor. A distance may be calculated based on the travel time. As described in greater detail below, other input devices and/or sensors may be used to detect or receive input and/or assist in detected a gesture.

Figure 2A:
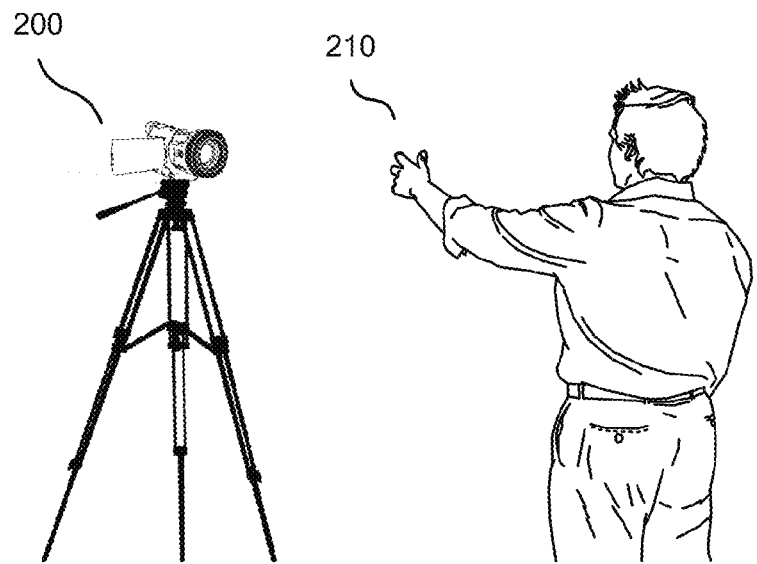
FIGS. 2A and 2B are example scenarios of gestures being detected by an image recording device according to some embodiments.
Figure 2B:
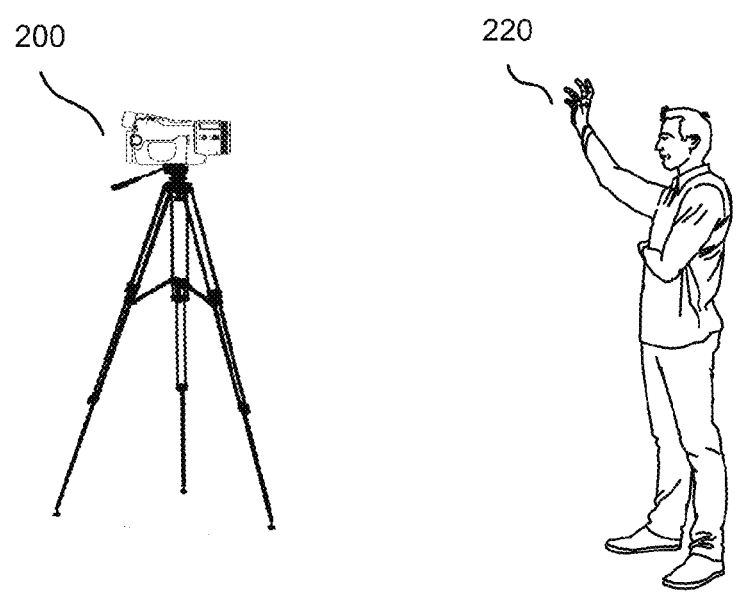

Referring to FIGS. 2A and 2B, example scenarios show an image recording device 200 recording a user making gestures according to some embodiments. Image recording device may be consistent with the descriptions in FIG. 1 and device 100. In FIG. 2A, the user is making a gesture 210 toward the camera 200 while being recorded. The gesture 210 may be a pointing motion with the user's left hand toward the camera, for example. The camera 200 may record just a single picture of the user making the gesture, or may record a sequence of images of the user raising his hand to make the gesture 210. After or during recording, camera 200 may perform methods according to some embodiments for detecting whether a gesture 210 is being performed by the user.

In FIG. 2B, the user is making a different gesture 220, this time with his right hand. The user may be raising his arm and showing his right hand in an open palm motion to the camera 200. In other cases, the user in FIG. 2B may be waving to the camera with his right hand. Methods according to some embodiments may be able to distinguish gestures made with the right hand and the left hand. Methods according to some embodiments may detect whatever is the gesture of the user. FIGS. 2A and 2B are merely simple examples of the types of gestures An example process for detecting gestures 210 or 220 in a sequence of images may be as follows. In some embodiments, a first gesture may be detected in one or more reference images. The reference image(s) may be the first image(s) of a sequence of images, such as the gesture 210 detected in the first image of a sequence of images recorded by camera 200. In some embodiments, the methods for efficiently detecting the first gesture are described more below. In other cases, methods for detecting the first gesture in the reference image(s) may be performed according to gesture detection methods for a single image that are known in the art. After determining the first gesture, e.g. a left hand pointing at the camera, in some embodiments, a gesture model is selected that most closely matches the determined first gesture. The model gesture may be a composite image or model based off of hundreds or thousands of sample images or poses of that same type of gesture. For example, a gesture model of a left hand pointing may be based on hundreds or thousands of different left hands making a pointing motion. The gesture model most closely resembling the gesture 210 of the user may then be used to more efficiently detect gestures in later images in the sequence of images. For example, in the sequence of images recorded by camera 200 in FIG. 2A, methods may begin scanning the remaining images for gestures that look similar or identical to the gesture model of the left hand pointing. The gesture model of the left hand pointing may be prioritized as the first gesture model to be compared against in the sequence of images, over other gesture models used for detecting gestures in the remaining images. By prioritizing the gesture model selected in the reference image(s), methods for detecting gestures according to some embodiments may save energy and time by more quickly detecting the gestures in the remaining images in the sequence of images.

In some embodiments, other types of prioritizations are used to further improve performance and efficiency. Example prioritizations include prioritizing a second gesture model after the first gesture model, prioritizing a location on subsequent images based on a location in the reference image(s) where a gesture was detected, prioritizing a size of subsequent images based on the size of the gesture detected in the reference image(s), and using statistical analysis to determine what types of gestures are more likely to be detected over other gestures. The methods will be discussed more below.

Figure 3:
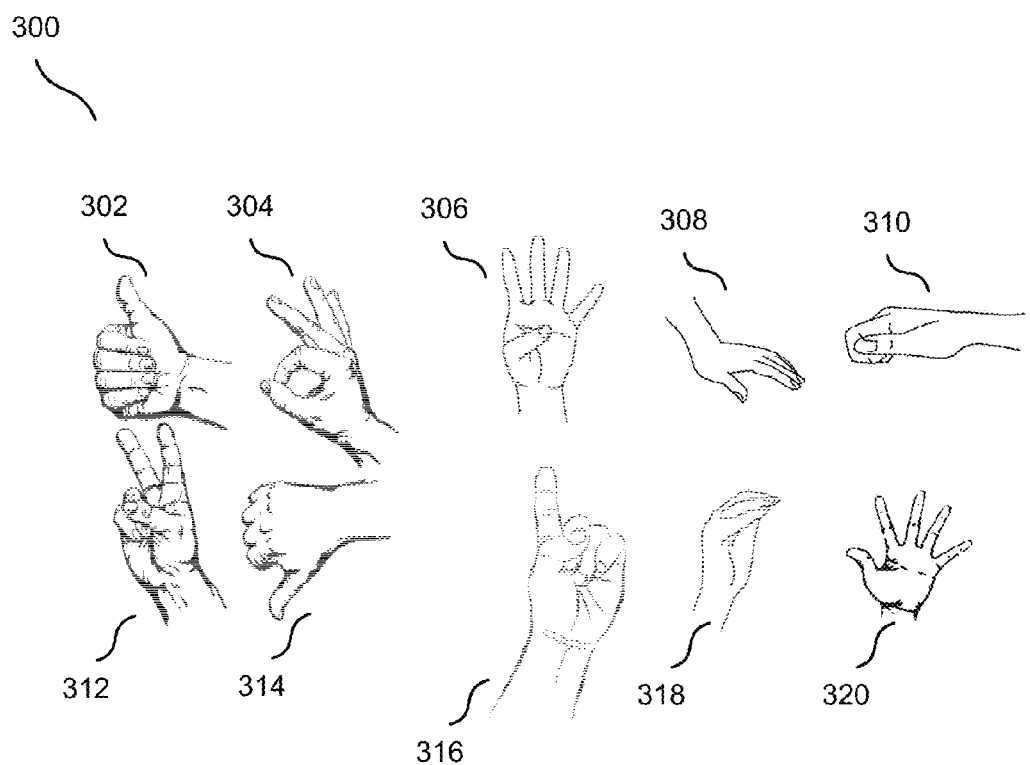
FIG. 3 illustrates example gestures and gesture models according to some embodiments.

Referring to FIG. 3, a database of model gestures 300 may be used to more efficiently detect gestures according to some embodiments. Here, example gestures 302, 204, 306, 308, 310, 312, 314, 216, 318, and 320 stored in a database 300 illustrate just a few of the many types of gestures detectable according to some embodiments. As mentioned above, in some embodiments, the database 300 may be composed of gesture models, where each gesture model may be an idealized composite of different types of gestures, e.g. gestures 302-320, based on hundreds or thousands of different images of the same type of gesture. In some embodiments, the model gestures may include models of more than just hand poses. For example, the model gestures may include idealized composites of arm poses, facial expressions, poses of an entire person, and motions composed of a sequence of poses. Embodiments are not so limited.

In some embodiments, the search for the gesture to be the same as the model may simply be a first technique to more efficiently detect the gestures. If this technique fails to detect the gesture, other techniques, discussed below, may be used. Thus, in some embodiments, this model-usage technique is prioritized over other techniques. In some embodiments, the detection using the gesture model is prioritized over detection using other models. In some embodiments, other types of prioritization techniques may be used to more efficiently detect gestures. Some examples are discussed more below.

In some embodiments, a database or lookup table (LUT) may be used to store the different models which are to be compared against when tracking the objects. For example, a left hand open palm may have a different stored image than a right hand open palm.

In some embodiments, information gained from prior detections in prior frames may be used to prioritize certain searching for features about the current frame. For tracker engagement, the pose and position may be stationary. This may give insight into operating mode prioritization based on prior information. If a left open palm is detected previously, a search for a left open palm may be performed before any other model response like right open palm. Similarly, the positions where the rectangles contained a match may be selected as the starting point for subsequent searches. In addition, the scales which had a match previously may be selected as the starting point.

In some embodiments, a predetermined block of pixels may be designated as a model size for the model (e.g. a model size of a right open palm is determined to be 40×40 pixels). This model size may be used as block sliding vertically and horizontally on the frame to better detect the gesture or pose. In some embodiments, the gesture or pose identified in the source image may then be scaled to match the model size, so as to be properly compared against the gesture model.

In some embodiments, detections from previous frames are utilized in order to aide where are the likeliest gestures or poses in the current frame. For example, the positions of the pixels where previous gestures or poses were detected may then be prioritized. Processing and memory usage can be saved therefore. In some embodiments, the positions within a given scale for which the gesture was previously detected may be prioritized. For example, a certain percentage area surrounding this position may be chosen—such as 10%—to allow for small object motion. The final object bounding box may be scaled to different scales and searches performed. This may avoid some scales getting eliminated.

In some embodiments, the scale or size of previously detected gestures or poses may be prioritized in the search of the current source image. For example, if an open palm of size 40×40 pixels was previously detected, then dimensions of an open palm of size 40×40 pixels may be searched for first in the current source image. For example, open palms of sizes near 40×40 pixels may be prioritized next. This technique may be referred to as scale prioritization.

In some embodiments, the scales where previously a gesture was detected accurately may be prioritized. A number of rectangles providing a match on a given scale, and/or rectangle position against a rectangle containing the gesture may be used as a measure for this. One scale above and below the chosen scale may be allowed, for example to allow for small motion (along the camera axis) of the object being detected/tracked.

In some embodiments, probabilistic usage statistics may be implemented to more quickly determine the more likely gestures or poses. For example, if probabilistic usage statistics show that a right hand open palm is more likely to appear than a left hand open palm, then a right hand open palm gesture or pose may be searched for first.

Typically hand-held devices are single user devices. And the user may have a specific statistical property associated with respect to usage like left/right handed, operating the device from a certain distance, and/or size of the open palm. The described processes may be prioritized for these characteristics before performing a broader search. This model may probabilistically minimize the processing time for first time object detection performed for each engagement.

A probability model for each characteristic may be maintained for the user on the device. The probability model may be updated after every use. For example, if the user uses right open palm for more than 50% of engagement, right open palm is searched before searching left open palm. Using the open palm size or scaling level probability, the scale levels may be prioritized for searches.

In some embodiments, a search for a gesture or pose may be designated to end early when a predetermined number of gestures or poses is already detected. For example, a tracking apparatus may stop scanning once it has found 3 open palm images in the frame. This process can save processing and memory usage by not needing to scan the rest of the frame.

For example, with maximum number of hands specified as 1, the detector can return as soon as a match is found. Engagement may include finding only one gesture in case of gesture recognition in mobile devices in some embodiments. For a TV, application, the number of hands detected and tracked maybe up to 10, for example. A different numbers of hands may be detected and/or tracked in some embodiments.

A combination of prioritization and maximum number of gestures to be detected, search pixel positions for frames, and/or following the frame where the first model match is obtained may be used, for example to reduce processing and/or save power. In some embodiments, the object detector may perform excessive computation only until the first frame where an object/model is detected for an engagement and/or re-engagement scenario. The first frame processing time may depend on usage statistics or the user's habit. Effectively, the first detection processing load may drop over time (for example when adequate usage statistics are available).

If the number of detections on all scales is less than a threshold, a full search may be performed instead of a prioritized search. In addition, if there is a decline in a number of rectangles over time (e.g. over multiple frames), a full search may be performed when hitting a threshold. This may avoid false negatives due to displacement of object or orientation change. Multiple rectangles may be detected as there may be many matches on spatial neighborhood of each scale and in addition there may be matches from multiple neighboring scales. Searching the positions already searched may be avoided by priority search.

Similarly, a priority search may be performed instead of a full search if positive search results are more than a threshold.

In some embodiments, a combination of any or all of these prioritizations may be implemented to more efficiently detect gestures or poses of objects in an image. For example, in some embodiments, a combination of a prioritized gesture model, prioritized position, and prioritized scale may be used to determine whether a gesture is being performed in the sequence of source images. The combination may include all three types of prioritizations or just two of the three, for example. When determining whether the gesture is performed using the combination of prioritizations, the source images may first be scanned using the first gesture model, scaled at the prioritized scale, and at the position of the prioritized position, for example. Alternatively, if combination includes just the first gesture model and the prioritized scale, then the first gesture model may be used, sized at the prioritized scale, and scanning may begin at some default position, e.g., the top left corner of the source images, for example. Persons with skill in the art would readily understand how other combinations may be used to determine whether the gesture is being performed in the source images.

Figure 4:
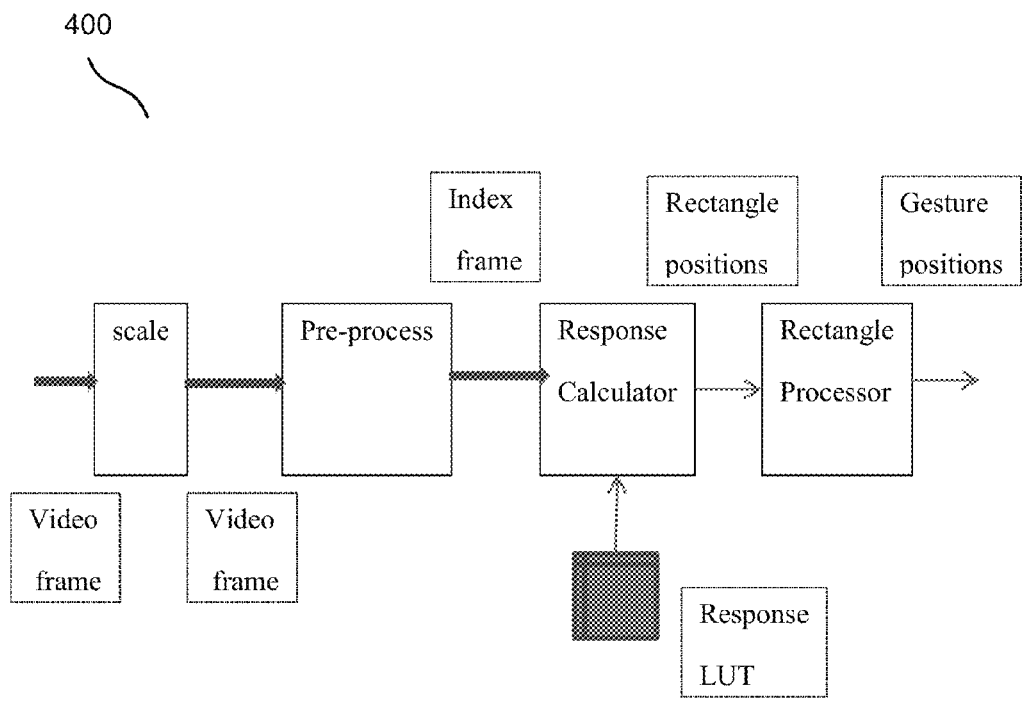
FIG. 4 illustrates an exemplary process flow according to some embodiments.

Referring to FIG. 4, block diagram 400 illustrates an example method flow for detecting a gesture in a reference image according to some embodiments. The sample technique shown herein may be a process for initially detecting a gesture, after which a model prioritization or other types of prioritizations, described above, may be based on for detecting gestures in subsequent images. This example flow may include four processes as shown: scaling, pre-processing, response calculation, and rectangle result processing. Scaling may handle detection of open palms, or other gestures or controls, of different sizes. Detection of part of an image of what is thought to be a gesture may be scaled larger or smaller to fit a predetermined size of gesture models or other types of database images used for comparison. The pre-processing stage may generate features, such as wrinkles, shadows, and other lines common to body parts making gestures. The third stage may compute a response for the selected features of the particular classifier stage. The final stage may eliminate any false detections and/or duplicate detections. The first two stages may be candidates for acceleration, for example using mathematical hardware units present in SIMD DSPs and GPUs. In some embodiments, the third stage (e.g. cascaded classifiers) may include excessive data fetch oriented and may consume most of the processing power and memory bandwidth. The third stage is discussed more below. Using fast memory and cache prefetch may minimize data fetch related CPU stalls. The final stage includes grouping detected gesture rectangle positions, and may eliminate false/duplicate rectangles and provide final rectangle position containing the gesture. This stage may be implemented so as to be low on CPU and memory usage.

Embodiments may perform the methods described in FIG. 4 within various apparatuses. For example, an input may comprise a video frame or other image, for example as captured by a camera of a gesture detection system. FIG. 4 may be implemented by the apparatus in FIG. 1 or camera in FIG. 2, for example. Also, a certain motion or pose may be used as an engagement gesture. A user may perform various gestures, motions, or poses, which may be detected by an apparatus of some embodiments. The apparatus may then conduct at least some of the methods described herein.

Figure 5:
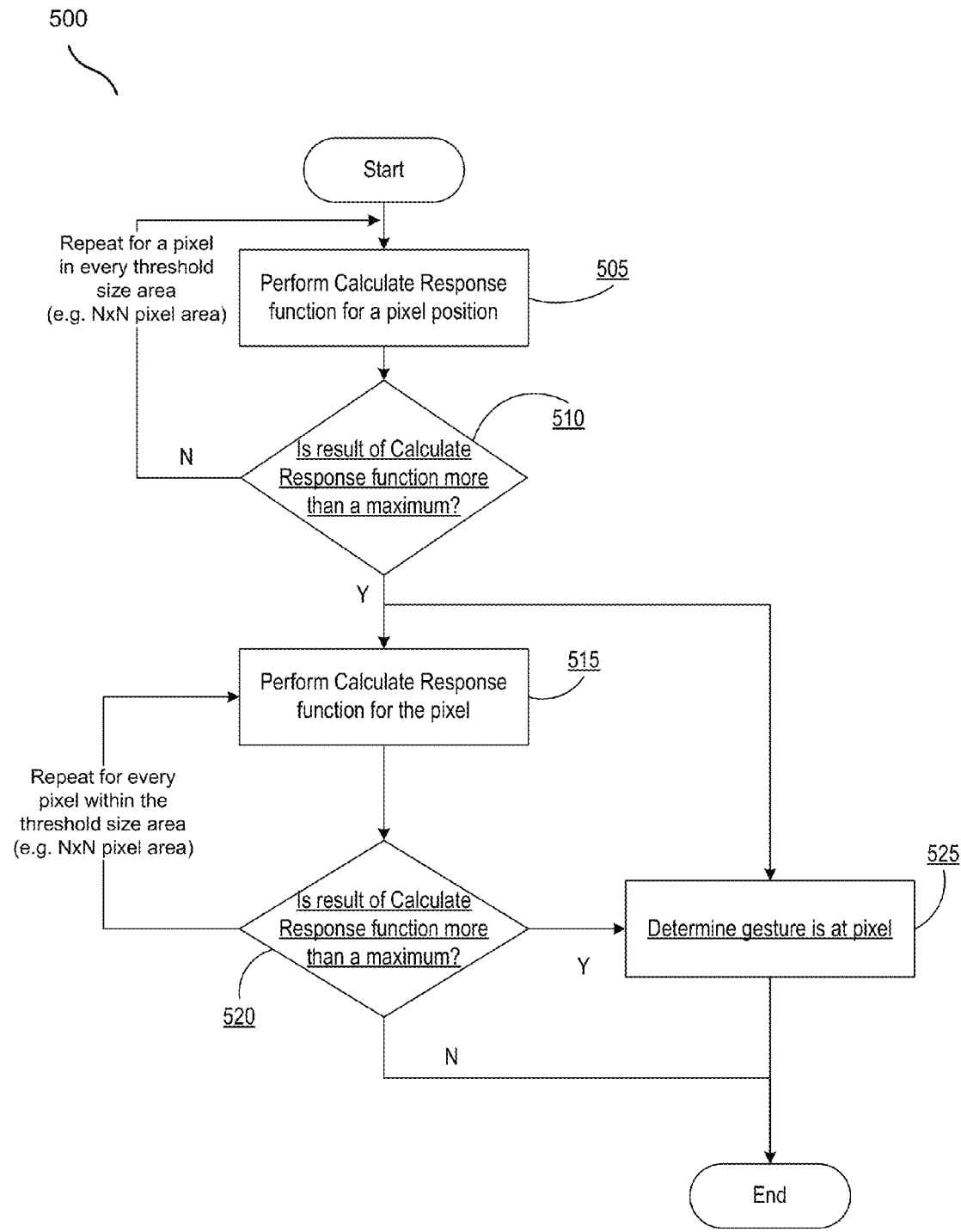
FIG. 5 illustrates an exemplary flowchart for detecting gestures according to some embodiments.

Referring to FIG. 5, block diagram 500 shows an exemplary process flow for a process of calculating response. This block diagram 500 may be an example process for implementing the response calculator block in FIG. 4, for example. In general, block diagram 500 illustrates a method for determining whether a gesture is in an image. FIG. 5 may describe an efficient method for detecting gestures using a two-stage method. The second stage may involve an increasing level of tracking detail over the first stage. For example, the first stage of detection involves searching one pixel per every n pixels horizontally and vertically (e.g. searching every $4^{th}$ pixel of the frame in an (x+/−4, y+/−4) pattern). This is shown in blocks 505 and 510. Block 510 conducts a threshold test to determine if the gesture detection analysis according to the calculate response function detects signs of a user's hand or other body part. Process flow 500 may loop through blocks 505 and 510 for a pixel in every threshold size area (e.g. 4×4 pixel area, 3×3 pixel area, etc.), until a response is obtained for each area.

The second stage may focus only on areas or pixels where the desired gesture or pose was detected, thereby decreasing the number of scans needed. Thus, the second stage may search in a more focused area with an increased level of detail, e.g. every $2^{nd}$ pixel (x+/−2, y+/−2), or every single pixel (x+/−1, y+/−1). Blocks 515 and 520 represent this analysis that involves another iterating loop. Here, a finer level of gesture detection is used only around the pixels in the first stage that detected a gesture. In this way, the second stage has a finer level of detail, but focuses only on a portion of the image from the first stage that resulted in a positive detection. At block 520, if it is determined that the calculate response function is more than some maximum threshold, indicating a positive detection of a part of the body, then it may be concluded at block 525 that the gesture is being performed at the scanned pixel.

In some embodiments, a multi-stage cascading process may be used. For example, an 8-stage cascading process may be used, where stages 1-4 search every $4^{th}$ pixel, stages 5-6 search every $2^{nd}$ pixel only around pixels with positive detections in stages 1-4, and stages 7-8 search every pixel only around pixels with positive detections in stages 5-6. Then, if the last cascade stage results in a positive detection at certain pixels, it can be determined that the desired gesture or pose is present in the frame at those certain pixels. Because each stage focuses on an increased level of detail only around those pixels with a high confidence of gesture/pose detection, processing and time are saved by not tracking a high level of detail for pixels where no gesture or pose is detected.

Figure 6:
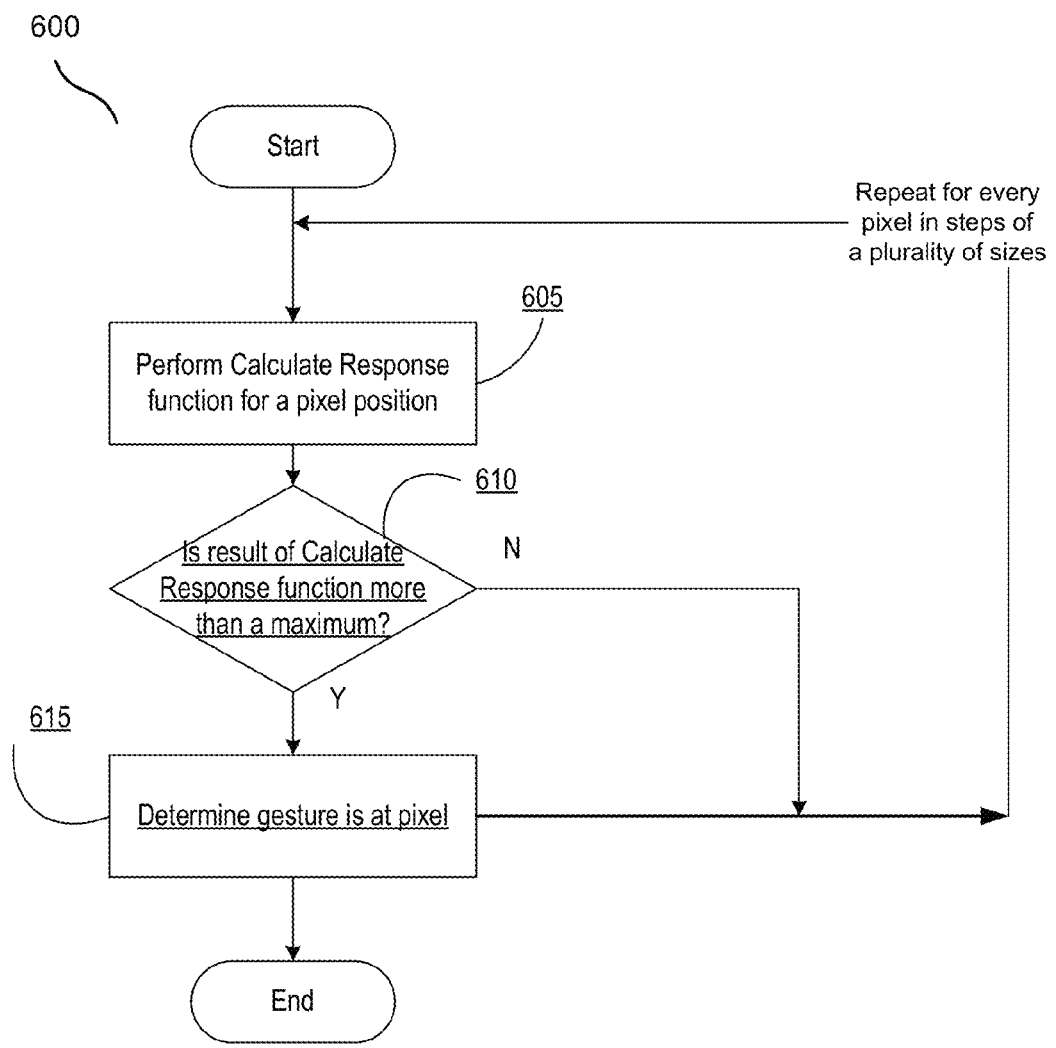
FIG. 6 illustrates another exemplary flowchart for detecting gestures according to some embodiments.

Referring to FIG. 6, diagram 600 illustrates an exemplary process flow of some embodiments utilizing cascading algorithms according to the multi-stage cascading processes described herein. For example, if the calculate response can be performed every $4^{th}$ position for cascade stages 0 and 1, then about 72% of cycles can be saved as compared to when the stage 0 and 1 computation is performed on every pixel. In FIG. 6, blocks 605, 610, and 615 may be performed for each pixel in a first step size, for example a step size of 4, in some embodiments. Blocks 605, 610, and 615 may then be performed for each pixel in a second step size, for example a step size of 2, in some embodiments, and in certain embodiments may then be performed for a third step size, for example a step size of 1.

In FIG. 6, the plurality of step sizes may comprise 4, 2, 1, for example as discussed above. In some embodiments, the step sizes comprise 8, 4, 2, 1. Other step sizes may be used in some embodiments. In some embodiments, utilizing 4, 2, 1 search step sizes provides about 30% speed-up compared to traditional methods for the same detection accuracy.

The detection accuracy may be retained or improved in the present methods since the step size is gradually decreased as the confidence builds up on the cascade classifier that there is a possible open palm or an object. For example, the first two stages on returning with true negatives may retain the maximum step size, for example 4 in the case of 4-2-1 search. That is, skip 3 positions for further search when the positions returned on first two stages. If the cascade classifier made it to stages 3 to 8, then +/−2 search may be performed around the positions that made it to stages 3 to 8. Finally, if a gesture is detected from the detector, the search position may be refined to +/−1 around the positions where the object is detected. Thus, the search step size may be 4 in areas outside the object or open palm, thereby avoiding excess computation. Further, note that every pixel position may be searched in areas containing a gesture being detected. In this way, the process illustrated in FIG. 6 may retain detection accuracy while saving cycles by 30% compared to traditional gesture detection methods.

In some embodiments, there are 8 cascaded stages. The prior cascade stage passes all open palms rectangles and other rectangles to be processed by the next stage. As the stages progress, the amount of false positives decrease. And, when the last stage completes, a detected gesture is returned if there is one. At any pixel position, all stages could exit, thereby indicating that the image does not have a gesture.

In addition, the step size may be clipped to fit within the frame boundaries on the four boundaries of a video frame. For example, if making a step size of 4 would reach beyond the active pixel area, the step size may be clipped to retain the search pixel position to the last possible pixel in the active region. This may improve detection accuracy of objects that have their bounding box edge close to the active pixel area boundaries.

Figure 7:
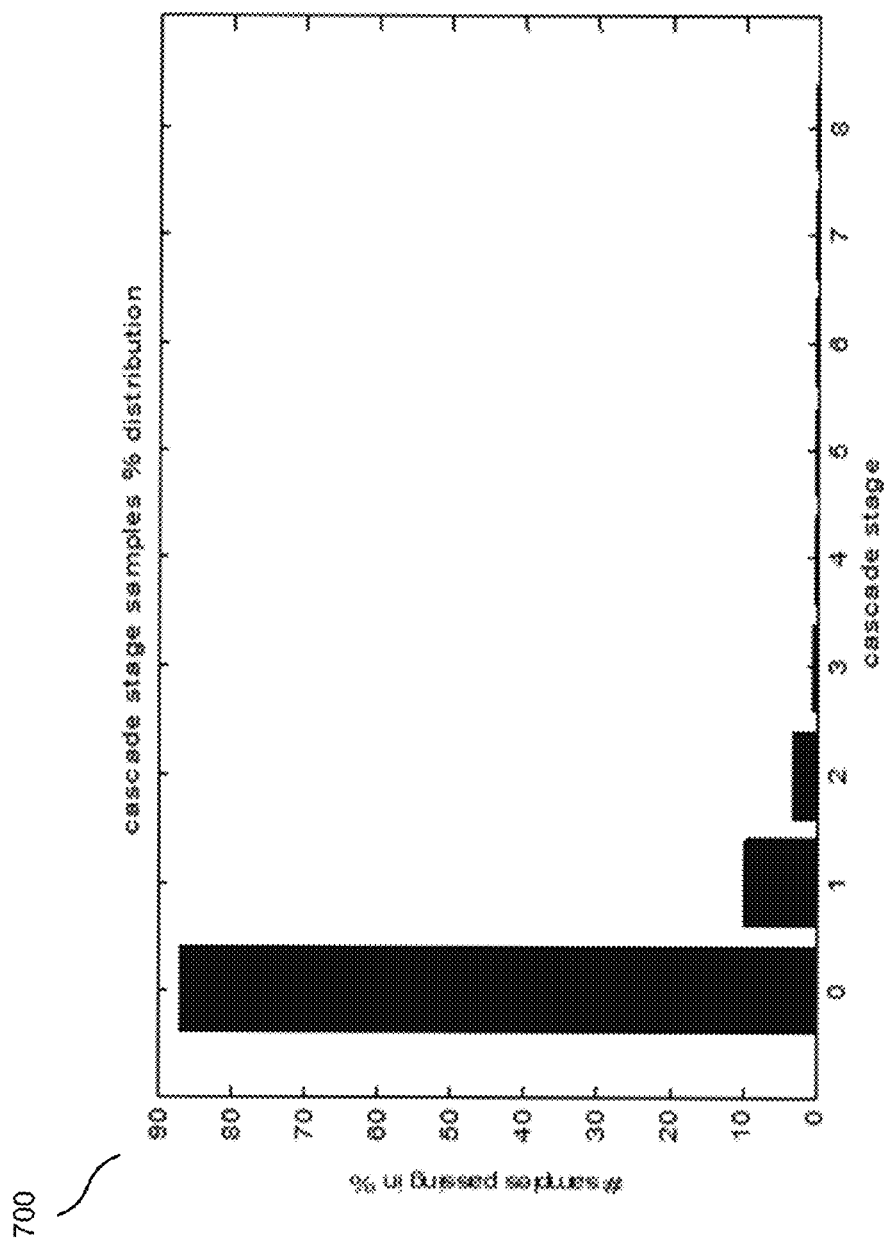
FIG. 7 illustrates an example cascades stages samples distribution according to some embodiments.

Referring to FIG. 7, graph 700 illustrates an example amount of processing that may occur at each cascaded stage. In this example, 86% of pixel positions returned on stage 0 without detecting open palm for some embodiments. In this case, the image scanned contained a single gesture, an open palm. Another 10% of pixel positions returned on stage 1 saying the positions do not have the open palm. The remaining stages 2 to stage 7 returned a smaller number of positions without open palms. When all the stages passed through an open palm, the positions returning open palm positions are displayed on x-axis label 8. As FIG. 7 shows, since most of the pixels at stage 0 did not have any signs of the desired pose, there would be no need to search around those pixels, saving processing and time. FIG. 7 gives an idea that most of the time is spent on stage 0 and stage 1 as they process the most number of pixel positions (rectangles of 40×40 dimension). It may be desirable to reduce the amount of pixels processed by stages 0 and 1 without affecting detection accuracy, thereby saving cycles. Some embodiments implement the idea of searching or model matching with narrowing step sizes.

Referring to FIG. 8, diagram 800 shows a 40×40 model dimension block 810 sliding on a video frame horizontally and vertically. In some embodiments, the block (40×40) may represent an incremental area that is used in a first stage of detection in the cascaded stages. The model dimension block 810 may incrementally scan the image for a gesture by sliding vertically and horizontally across the image. Once block 810 detects a gesture within its dimensions, a scan with finer resolution within the location of where block 810 found the gesture may be performed. This scanning may be consistent with the cascaded stages described above. For example, block 810 may perform only a stage 0 scan until block 810 finds gesture 820. When block 810 slides vertically and horizontally to where open palm gesture 820 is located, higher stage scans may be performed to more accurately determine that a gesture is in fact located there. In some embodiments, to match the model dimension, the video frames may be normalized such that the open palm size in the video matches the open palm represented by the model.

The methods and apparatuses according to various embodiments may provide the following advantages:

1. Cycle and bandwidth saving beyond 30% without drop in detection accuracy with 4, 2, 1 step size adaptation and refinement, using the response of the cascade classifier.

2. After first object detection, where engagement includes the object being stationary for a period of time (e.g., 500 ms), the cycles, bandwidth and power savings may be beyond 90%.

3. First time object detection performance improved from prior usage/engagement statistics. Depending on the user characteristic, the processing time may be reduced up to 50%.

4. Embodiments are friendly for hardware development and parallel processing.

5. Embodiments are fast and make hand gesture recognition feasible on mobile battery operated devices.

Figure 9A:
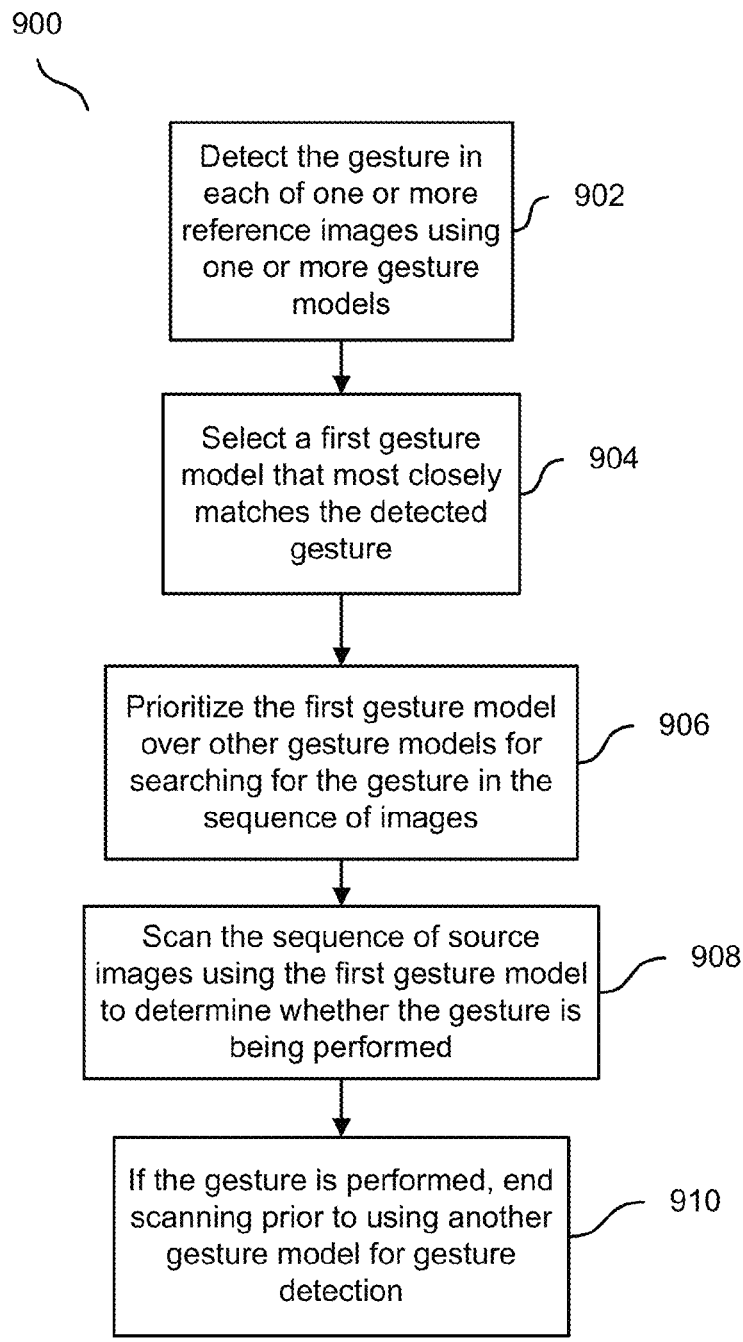
FIGS. 9A and 9B illustrate exemplary flowcharts according to some embodiments.

Referring to FIG. 9A, flowchart 900 illustrates an exemplary methodology according to some embodiments. Starting at block 902, in some embodiments, a gesture may be detected in each of one or more reference images using one or more gesture models from a plurality of gesture models. The detection may be performed by any of the processes described above, for example. The one or more gesture models may be any of the example gestures described in FIG. 2 or 3, or any other types of gesture models based on any number of gestures. The detection in block 902 may use the one or more gesture models by comparing the gesture scanned in the one or more reference images to multiple gesture models. For example, if a right open palm is recorded in a reference image, then the scanned gesture may be compared against first a model of a left open palm, then a model of a left closed fist, then a model of a right open palm, and so forth, until the best matching gesture model is found. In some embodiments, the scanned gesture in the reference image may be first scaled to a comparable size of the gesture models, in order to perform proper comparison. Block 902 may be implemented by, for example, device 100 or camera 200.

At block 904, a first gesture model may be selected that most closely matches the detected gesture in block 902. The first gesture model may be a gesture model among the one or more gesture models compared against in block 902. For example, the right open palm gesture model may be selected as the first gesture model for a detected gesture that is a right open palm. Block 904 may be implemented by, for example, device 100 or camera 200.

At block 906, the first gesture model may be prioritized over other gesture models for searching for the gesture in the sequence of images. Once the gesture has been detected in the one or more reference images, the first gesture model selected in block 904 may be the first model compared against when searching for gestures in the source images. In some embodiments, the one or more reference images are previous images of the sequence of source images. For example, the one or more reference images may be the initial frames of a video, and the remaining frames of the video may be the subsequent images subject to the gesture detection. Thus, the gestures detected in the reference images are more likely to be the gestures present in the subsequent source images, making the prioritization of the first gesture model highly efficient. Block 906 may be implemented by, for example, device 100 or camera 200.

At block 908, the sequence of source images may be scanned using the first gesture model to determine whether the gesture is being performed in the source images. In other words, because the first gesture model is prioritized over other gesture models, the first gesture model is used to scan the sequence of source images. Block 908 may be implemented by, for example, device 100 or camera 200.

At block 910, if the gesture is determined to be performed in the sequence of source images, then scanning may end prior to using another gesture model for gesture detection. In some embodiments, scanning may continue if the gesture is not detected according to the first gesture model. Block 910 may be implemented by, for example, device 100 or camera 200.

Figure 9B:
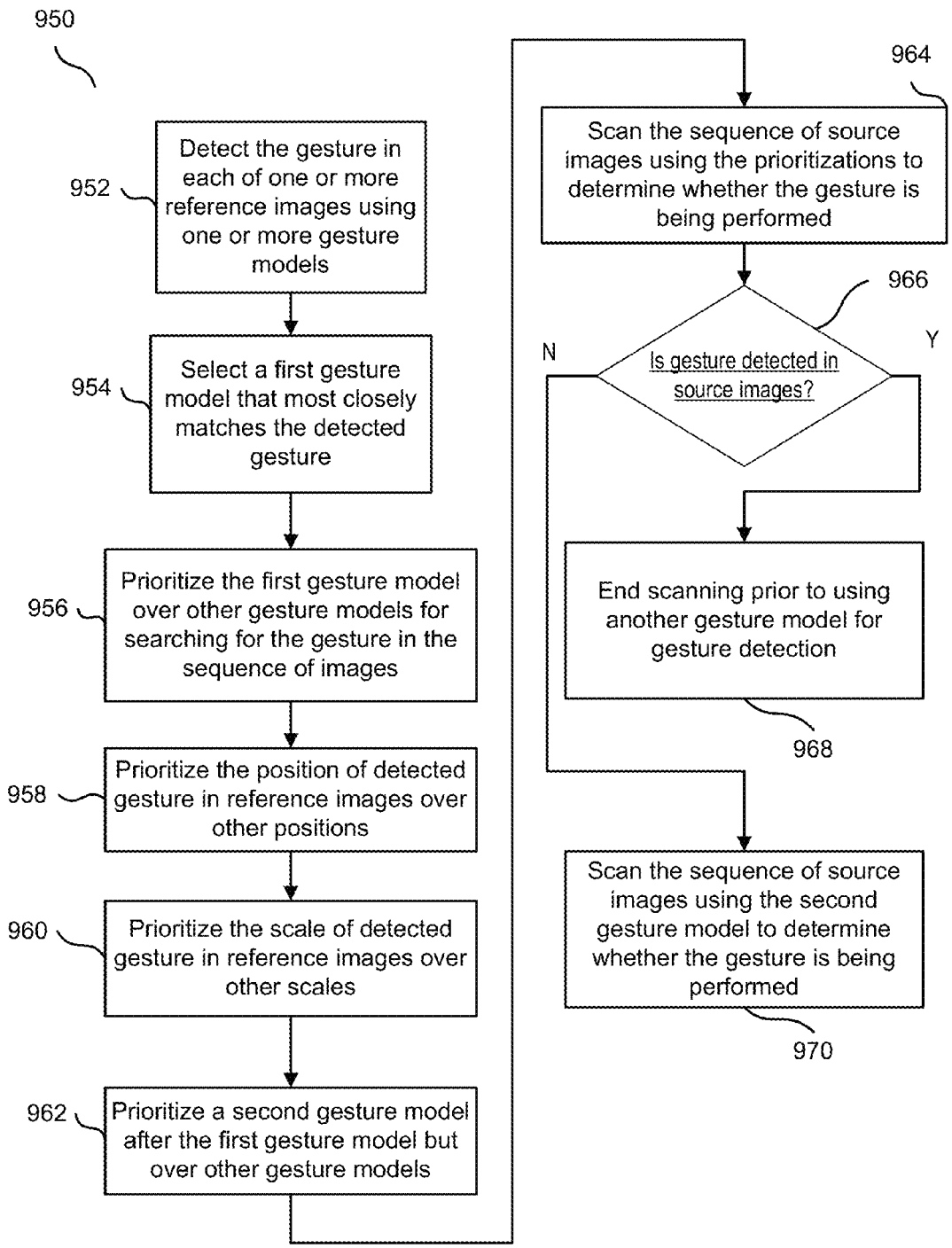

Referring to FIG. 9B, flowchart 950 illustrates another exemplary methodology according to some embodiments. Blocks 952, 954, and 956 may be consistent with the descriptions discussed in relation to blocks 902, 904, and 906, respectively. Blocks 952, 954, and 956 may be implemented by, for example, device 100 or camera 200.

In some embodiments, other characteristics of the detected gesture in the one or more reference images may be prioritized as well. Some, all, or none of these prioritizations may be implemented, depending on the embodiment, and embodiments are not so limited. For example, at block 958, the position of the detected gesture in the one or more reference images may be prioritized over other positions in the images. For example, when beginning scanning of the source images for the gesture, the position(s) of where the gesture was detected in the one or more reference images may be scanned first over other positions. Block 958 may be implemented by, for example, device 100 or camera 200.

At block 960, the scale of the detected gesture in the one or more reference images may be prioritized over other scales in the source images. For example, if the size of the detected gesture in the one or more reference images was approximately 40×40 pixels, then a 40×40 scale may be used first when scanning for the gesture in the source images. Block 960 may be implemented by, for example, device 100 or camera 200.

At block 962, a second gesture model may be prioritized after the first gesture model but over other gesture models. For example, if the first gesture model is a right open palm, the second gesture model may be designated as a right closing hand. The selection of the second gesture model may be based on statistical methods or analysis, based on a most likely gesture that would appear next after some initial gesture. In other cases, the second gesture may be selected as a gesture that was previously recorded or detected, found either in different locations of the reference images or based on user input, for example. The prioritization of the second gesture model after the first gesture model but over other gesture models may indicate that the second gesture model is used to search for gestures if the first gesture model is unsuccessful in detecting a gesture. Block 962 may be implemented by, for example, device 100 or camera 200.

At block 964, the sequence of source images may be scanned using any of the prioritizations, for example, in blocks 956, 958, 960, or 962, to determine whether the gesture is being performed in the sequence of source images. Again, some, all, or none of these prioritizations may be used. Other prioritizations may be used that are consistent with any of the descriptions discussed in these disclosures, as these are merely just a few examples. Block 964 may be implemented by, for example, device 100 or camera 200.

At decision block 966, methods may determine whether the gesture is detected in the sequence of source images. The detections may be based on the prioritizations discussed in block 964, and on any of the detection methods discussed in these disclosures (e.g. the cascaded stages, etc.). In some embodiments, other detection methods known in the art may be used, in conjunction with the prioritizations discussed herein. Decision block 966 may be implemented by, for example, device 100 or camera 200.

If the determination at block 966 is yes, then at block 968, scanning may end prior to using another gesture model for gesture detection. At block 970, if the determination is no, then the sequence of source images may be scanned using the second gesture model to determine whether the gesture is being performed. For example, the right closing hand may be the second gesture model used to scan for the gesture in the sequence of source images. Additionally, other prioritizations may also be employed in conjunction with the second gesture model. In other cases, the other prioritizations, e.g. position prioritization, scale prioritization, etc., may not be used, or they may be modified to prioritize a different position, or scale, etc. Persons with skill in the art will appreciate the many combinations of prioritizations possible according to the disclosures herein, and embodiments are not so limited.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Figure 10:
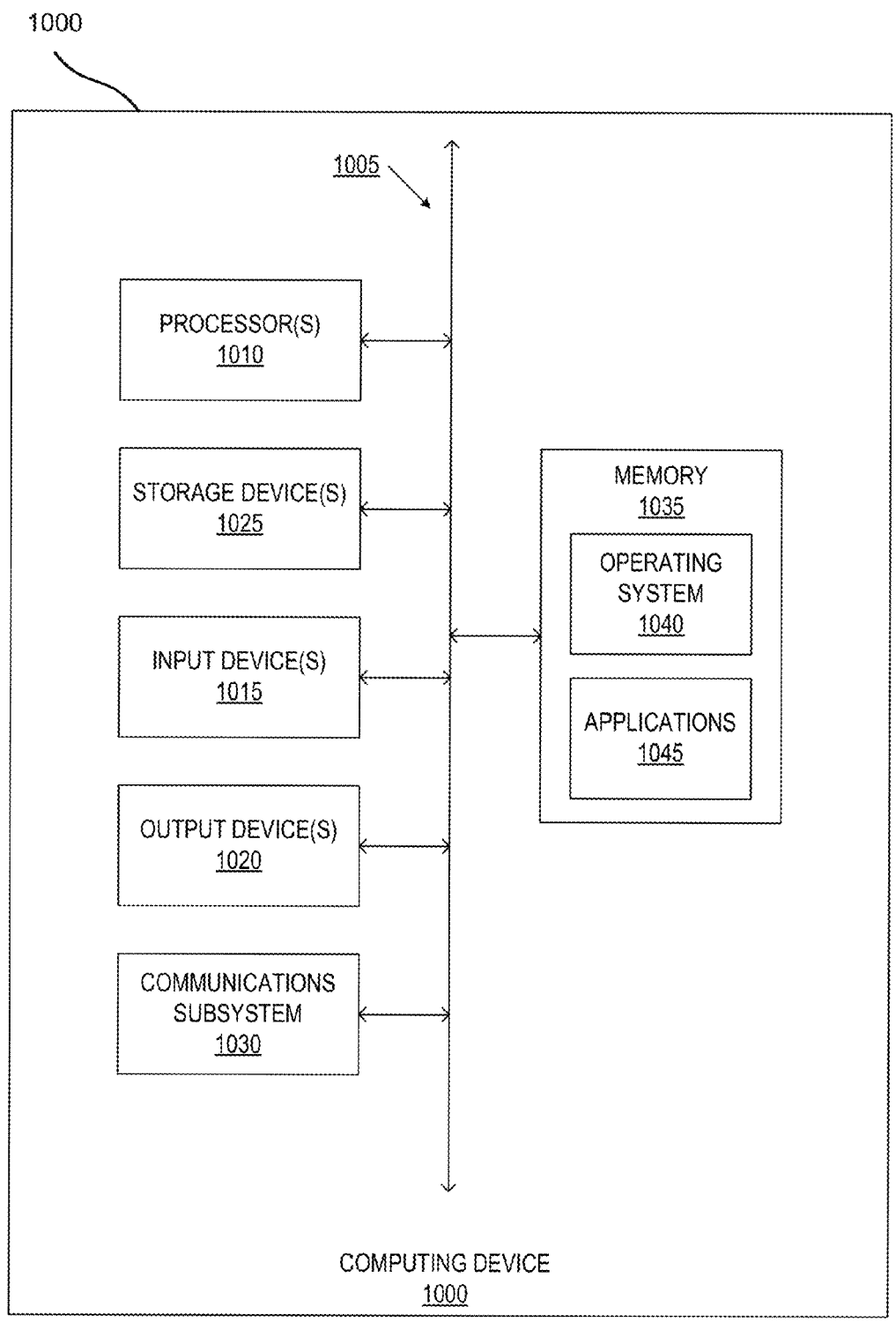
FIG. 10 illustrates an example computing system in which one or more aspects of the disclosure may be implemented.

Having described multiple aspects above, an example of a computing system in which such aspects may be implemented may now be described with respect to FIG. 10. According to one or more aspects, a computer system as illustrated in FIG. 10 may be incorporated as part of a computing device, which may implement, perform, and/or execute any and/or all of the features, methods, and/or method steps described herein. For example, one or more of the processor 1010, memory 1035, and communications subsystems 1030 may be used to implement any or all of the blocks as shown in FIGS. 4, 5, 6, 9A and 9B. For example, computer system 1000 may represent some of the components of a hand-held device. A hand-held device may be any computing device with an input sensory unit, such as a camera and/or a display unit. Examples of a hand-held device include but are not limited to video game consoles, tablets, smart phones, and mobile devices. In some embodiments, the system 1000 is configured to implement the devices 100 or 200 described above. FIG. 10 provides a schematic illustration of one embodiment of a computer system 1000 that can perform the methods provided by various other embodiments, as described herein, and/or can function as the host computer system, a remote kiosk/terminal, a point-of-sale device, a mobile device, a set-top box, and/or a computer system. FIG. 10 is meant only to provide a generalized illustration of various components, any and/or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a camera, a mouse, a keyboard and/or the like; and one or more output devices 1020, which can include without limitation a display unit, a printer and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 may further comprise a non-transitory working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIGS. 4, 5, 6, 9A and 9B, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1000) to perform methods in accordance with the disclosure. For example, some or all of the procedures of the described methods may be performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein, for example one or more of the elements of the method described with respect to any of FIGS. 4, 5, 6, 9A and 9B.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communications subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

What is claimed is:

1. A method for determining whether a gesture is being performed in a sequence of source images, the method comprising:
   detecting the gesture in a reference image;
   selecting, from a plurality of gesture models, a first gesture model that most closely matches the detected gesture, the first gesture model including a composite of images that include gestures having a same type of gesture as the detected gesture;
   scanning the sequence of source images using the first gesture model without using another gesture model to determine whether the gesture is being performed, the sequence of source images including a plurality of images obtained after the reference image, wherein scanning the sequence of source images includes comparing a source image obtained after the reference image with the first gesture model to determine whether the gesture is performed in the source image; and
   ending scanning of the sequence of source images using the first gesture model without using another gesture model of the plurality of gesture models to determine whether the gesture is being performed if using the first gesture model to scan the sequence of images to determine whether the gesture is being performed results in a determination that the gesture is being performed.

2. The method of claim 1, wherein the plurality of gesture models comprises hand poses.

3. The method of claim 1, wherein the plurality of gesture models comprises facial expressions.

4. The method of claim 1, wherein the plurality of gesture models comprises a left open hand model, a right open hand model, or a fist model.

5. The method of claim 1, further comprising:
   prioritizing a position of the detected gesture in the reference image over other positions for searching for the gesture in the sequence of source images; and
   scanning the sequence of source images to determine whether the gesture is being performed, using the prioritized position of the detected gesture.

6. The method of claim 1, further comprising:
   prioritizing a scale of the detected gesture in the reference image over other scales for searching for the gesture in the sequence of source images; and
   scanning the sequence of source images to determine whether the gesture is being performed, using the prioritized scale of the detected gesture.

7. The method of claim 1, further comprising:
   prioritizing a position of the detected gesture in the reference image over other positions for searching for the gesture in the sequence of source images;
   prioritizing a scale of the detected gesture in the reference image over other scales for searching for the gesture in the sequence of source images; and
   scanning the sequence of source images to determine whether the gesture is being performed, using a combination of the prioritized position of the detected gesture and the prioritized scale of the detected gesture.

8. The method of claim 1, further comprising ending scanning for the gesture in the sequence of source images before completing a full scan of the sequence of source images if a predetermined number of gestures is detected in the sequence of source images.

9. The method of claim 1, further comprising:
   determining that a second gesture is less likely to be detected in the reference image than the gesture; and
   scanning the reference image for the second gesture after detecting the gesture based on determining that the second gesture is less likely to be detected.

10. The method of claim 1, further comprising:
    scanning the reference image for the gesture;
    refining the scan of the reference image for the gesture in a plurality of cascaded stages ordered in a successive number of stages, wherein each stage of the cascaded stages comprises scanning a periodic number of pixels in at least one image to detect the gesture, the periodic number of pixels having a constant vertical and horizontal distance away from each other pixel in the periodic number of pixels, and wherein the periodic number of pixels in any stage is less than or equal to the periodic number of pixels in a previous stage; and
    identifying the gesture by determining if a last stage of the successive number of stages detects at least a portion of the gesture.

11. An apparatus for determining whether a gesture is being performed in a sequence of source images, the apparatus comprising:
    a memory configured to store one or more reference images and the sequence of source images; and
    a processor communicatively coupled to the memory and configured to:
    detect the gesture in a reference image;
    select, from a plurality of gesture models, a first gesture model that most closely matches the detected gesture, the first gesture model including a composite of images that include gestures having a same type of gesture as the detected gesture;
    scan the sequence of source images using the first gesture model without using another gesture model to determine whether the gesture is being performed, the sequence of source images including a plurality of images obtained after the reference image, wherein scanning the sequence of source images includes comparing a source image obtained after the reference image with the first gesture model to determine whether the gesture is performed in the source image; and
    end scanning of the sequence of source images using the first gesture model without using another gesture model of the plurality of gesture models to determine whether the gesture is being performed if using the first gesture model to scan the sequence of images to determine whether the gesture is being performed results in a determination that the gesture is being performed.

12. The apparatus of claim 11, wherein the plurality of gesture models comprises hand poses.

13. The apparatus of claim 11, wherein the plurality of gesture models comprises facial expressions.

14. The apparatus of claim 11, wherein the plurality of gesture models comprises a left open hand model, a right open hand model, or a fist model.

15. The apparatus of claim 11, wherein the processor is further configured to:
prioritize a position of the detected gesture in the reference image over other positions for searching for the gesture in the sequence of source images; and
scan the sequence of source images to determine whether the gesture is being performed, using the prioritized position of the detected gesture.

16. The apparatus of claim 11, wherein the processor is further configured to:
prioritize a scale of the detected gesture in the reference image over other scales for searching for the gesture in the sequence of source images; and
scan the sequence of source images to determine whether the gesture is being performed, using the prioritized scale of the detected gesture.

17. The apparatus of claim 11, wherein the processor is further configured to:
prioritize a position of the detected gesture in the reference image over other positions for searching for the gesture in the sequence of source images;
prioritize a scale of the detected gesture in the reference image over other scales for searching for the gesture in the sequence of source images; and
scan the sequence of source images to determine whether the gesture is being performed, using a combination of the prioritized position of the detected gesture and the prioritized scale of the detected gesture.

18. The apparatus of claim 11 wherein the processor is further configured to end scanning for the gesture in the sequence of source images before completing a full scan of the sequence of source images if a predetermined number of gestures is detected in the sequence of source images.

19. The apparatus of claim 11 wherein the processor is further configured to:
determine that a second gesture is less likely to be detected in the reference image than the gesture; and
scan the reference image for the second gesture after detecting the gesture based on determining that the second gesture is less likely to be detected.

20. The apparatus of claim 11 wherein the processor is further configured to:
scan the reference image for the gesture;
refine the scan of the reference image for the gesture in a plurality of cascaded stages ordered in a successive number of stages, wherein each stage of the cascaded stages comprises scanning a periodic number of pixels in at least one image to detect the gesture, the periodic number of pixels having a constant vertical and horizontal distance away from each other pixel in the periodic number of pixels, and wherein the periodic number of pixels in any stage is less than or equal to the periodic number of pixels in a previous stage; and
identify the gesture by determining if a last stage of the successive number of stages detects at least a portion of the gesture.

21. A non-transitory processor-readable medium comprising processor-readable instructions configured to cause a processor to:
detect a gesture in a reference image;
select, from a plurality of gesture models, a first gesture model that most closely matches the detected gesture, the first gesture model including a composite of images that include gestures having a same type of gesture as the detected gesture;
scan the sequence of source images using the first gesture model without using another gesture model to determine whether the gesture is being performed, the sequence of source images including a plurality of images obtained after the reference image, wherein scanning the sequence of source images includes comparing a source image obtained after the reference image with the first gesture model to determine whether the gesture is performed in the source image; and
end scanning of the sequence of source images using the first gesture model without using another gesture model of the plurality of gesture models to determine whether the gesture is being performed if using the first gesture model to scan the sequence of images to determine whether the gesture is being performed results in a determination that the gesture is being performed.

* * * * *